US008777313B2

(12) United States Patent
Butt et al.

(10) Patent No.: US 8,777,313 B2
(45) Date of Patent: Jul. 15, 2014

(54) ENTERTAINMENT SEAT

(75) Inventors: Timothy R. Butt, McCordsville, IN (US); Robert E. Allen, Ypsilanti, MI (US); Dinu Moraru, Westland, MI (US); Dustin J. Shedlarski, Commerce Township, MI (US)

(73) Assignee: Johnson Controls Technology Company, Holland, MI (US)

( * ) Notice: Subject to any disclaimer, the term of this patent is extended or adjusted under 35 U.S.C. 154(b) by 892 days.

(21) Appl. No.: 12/811,784

(22) PCT Filed: Jan. 5, 2009

(86) PCT No.: PCT/US2009/030129
§ 371 (c)(1),
(2), (4) Date: Oct. 13, 2010

(87) PCT Pub. No.: WO2009/089167
PCT Pub. Date: Jul. 16, 2009

(65) Prior Publication Data
US 2011/0043006 A1 Feb. 24, 2011

Related U.S. Application Data

(60) Provisional application No. 61/019,250, filed on Jan. 5, 2008, provisional application No. 61/019,255, filed on Jan. 5, 2008, provisional application No. 61/036,510, filed on Mar. 14, 2008.

(51) Int. Cl.
*A47C 1/035* (2006.01)

(52) U.S. Cl.
USPC ........................ 297/330; 297/85 M

(58) Field of Classification Search
USPC ................................. 297/330, 85 M
See application file for complete search history.

(56) References Cited

U.S. PATENT DOCUMENTS

| 3,837,635 | A | * | 9/1974 | Long et al. ............... 297/330 X |
| 3,865,430 | A | * | 2/1975 | Tanus ........................ 297/330 |
| D262,165 | S | | 12/1981 | Andries et al. |
| 5,374,104 | A | | 12/1994 | Moore et al. |
| 7,293,834 | B2 | * | 11/2007 | Riach et al. ................ 297/330 |
| 8,298,845 | B2 | * | 10/2012 | Childress .................. 438/47 X |
| 2001/0026087 | A1 | | 10/2001 | Tomita |
| 2001/0043003 | A1 | | 11/2001 | Knoblock |
| 2005/0069839 | A1 | | 3/2005 | Denne |
| 2006/0087158 | A1 | | 4/2006 | Kramer et al. |
| 2006/0186718 | A1 | | 8/2006 | Griepentrog et al. |

FOREIGN PATENT DOCUMENTS

GB 2383783 7/2003

* cited by examiner

Primary Examiner — Anthony D Barfield
(74) Attorney, Agent, or Firm — Butzel Long

(57) ABSTRACT

An entertainment seat (10) including a seat back (18) and seat base (24) having a seat architecture for providing structural support relative to a base (floor) and also having two seat motion actuators (92, 94) located toward the front of the seat (10) for providing seat movement in response to a seat motion control system (16) for operating the seat motion actuators (92, 94), the seat (10) also includes armrests (26, 28) which form a portion of the seat back (18).

11 Claims, 15 Drawing Sheets

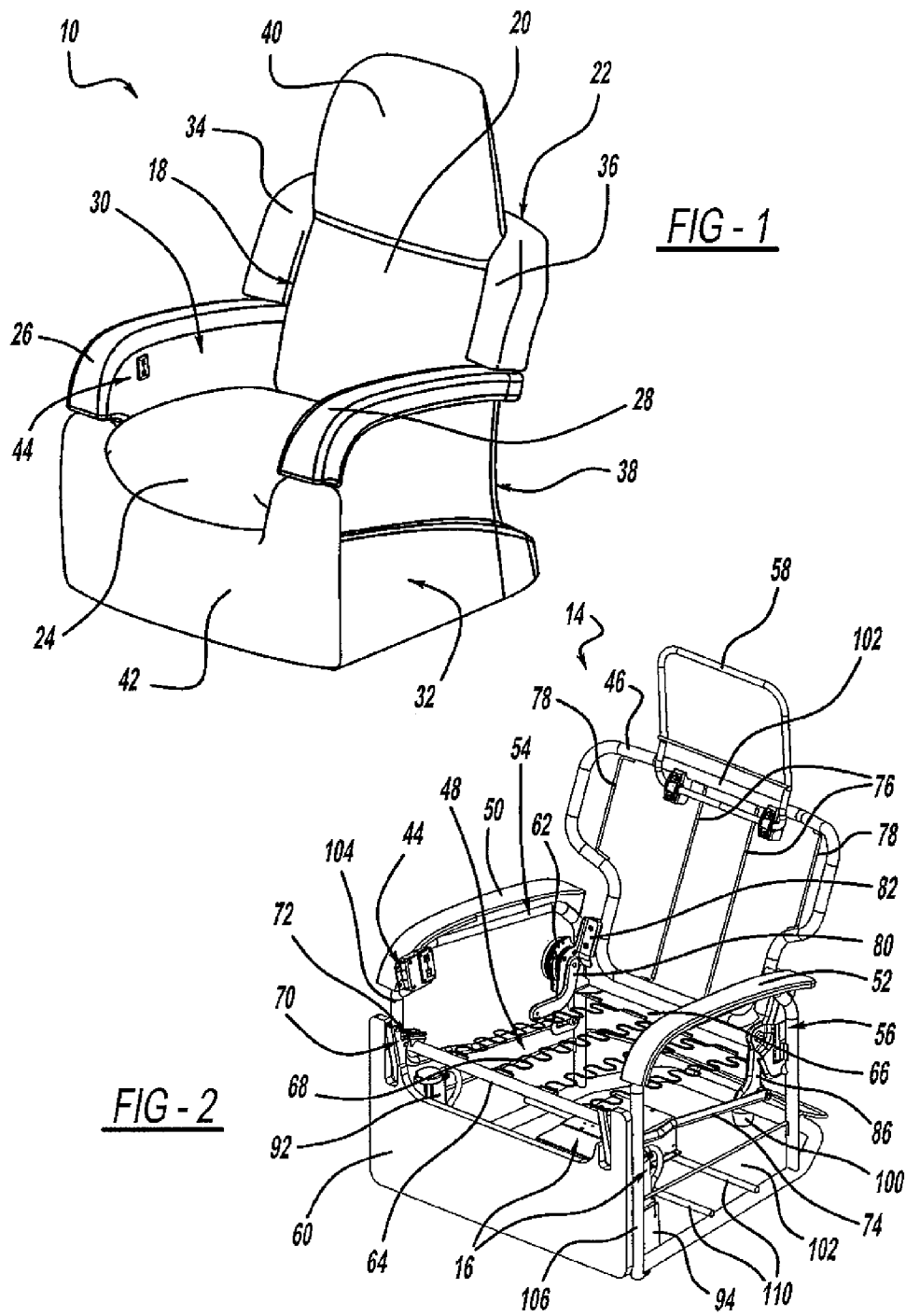

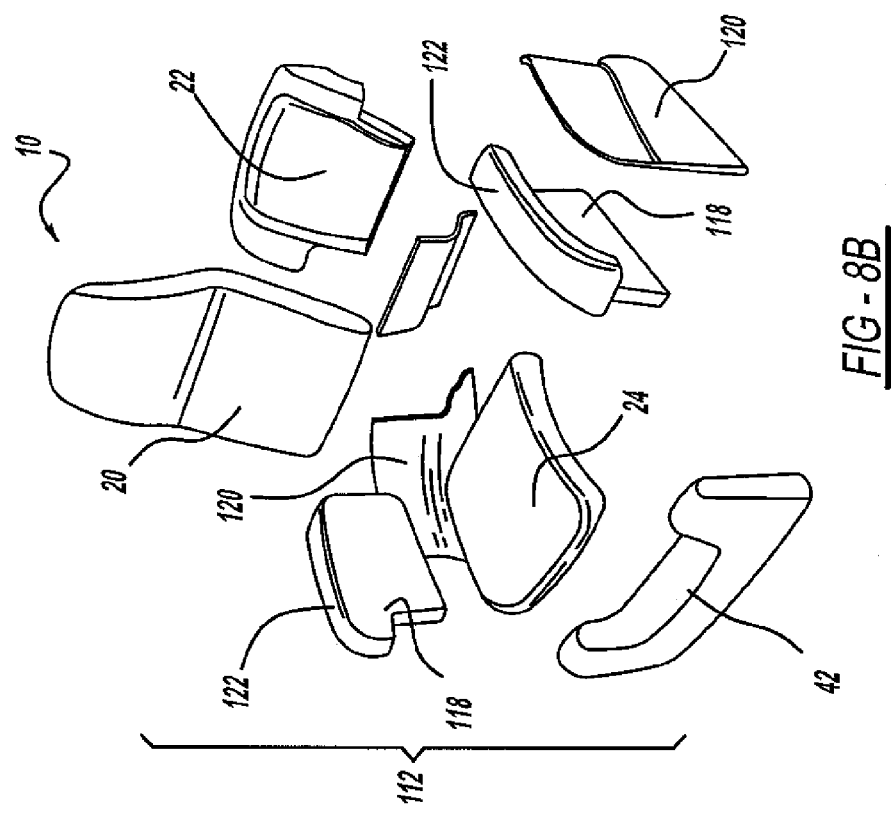
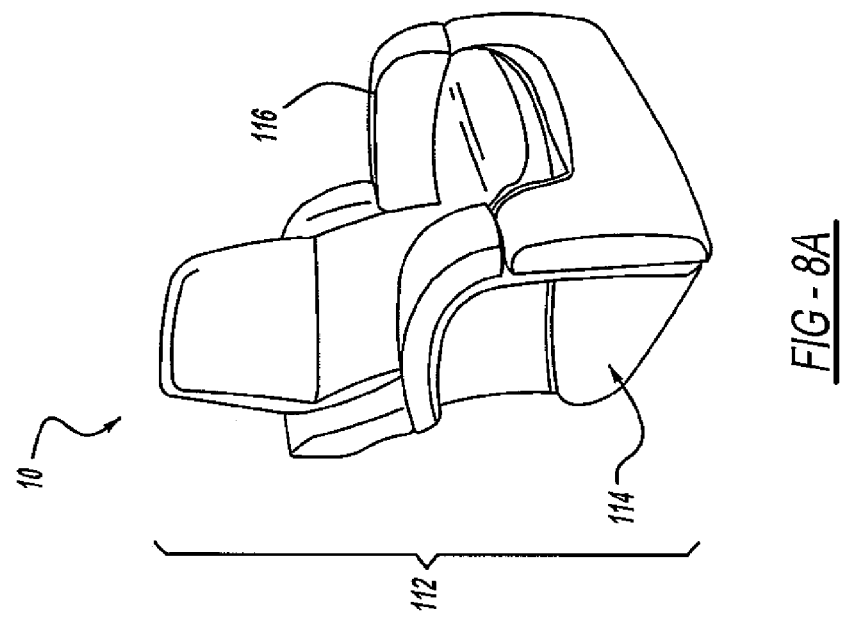

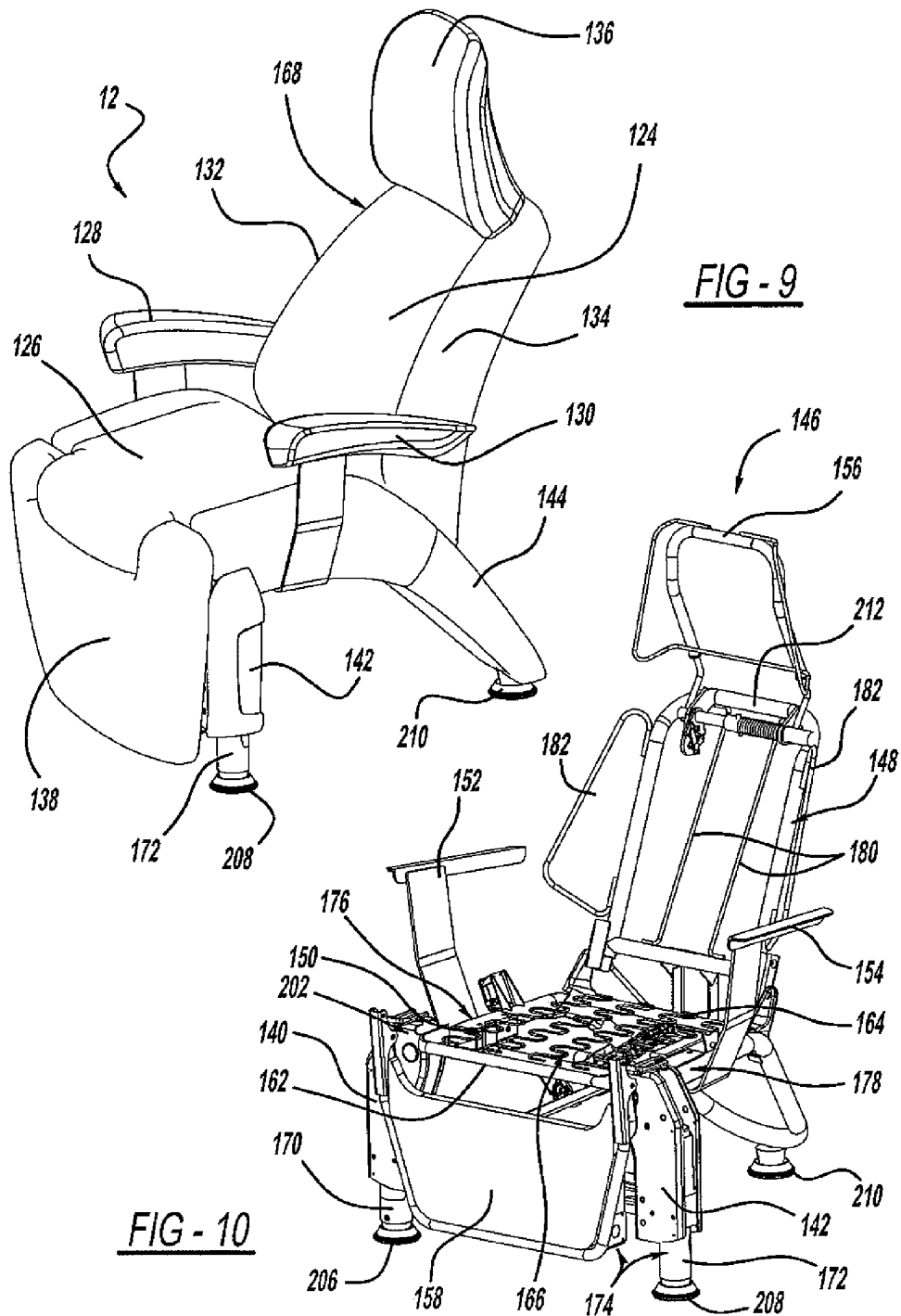

ENTERTAINMENT SEAT

CROSS-REFERENCE TO RELATED PATENT APPLICATIONS

This application claims the benefit of and priority to U.S. Provisional Patent Application No. 61/019,250, filed Jan. 5, 2008, titled: ENTERTAINMENT SEAT, in the name of Butt et al.; U.S. Provisional Patent Application No. 61/019,255, filed Jan. 5, 2008, titled: GAMING SEAT, in the name of Butt et al.; and U.S. Provisional Patent Application No. 61/036, 510, filed Mar. 14, 2008, titled: INTEGRAL ARMREST IN SEATBACK FOR ENTERTAINMENT SEATING, in the name of Butt et al. all of which are incorporated by reference herein.

BACKGROUND

The present disclosure relates generally to a seat for use in a variety of applications relating to entertainment or gaming seating. More particularly, the present disclosure relates to an entertainment seat that provides three-dimensional motion simulation for an immersive entertainment and/or sensory experience for a user.

A variety of entertainment seats are currently in use. The popularity of video games, home theaters, cinemas, movie theaters, amusement parks, gaming arcades, and the like has increased dramatically in recent years. Entertainment seats currently available are known to provide an enhanced experience for users. For example, reclining seats containing cup holders, storage trays, position controls, Integrated speakers, etc. are currently used in multiple entertainment facilities and private residences. Some entertainment chairs or seats simulate real-time gaming situations, such as a driver of a race car, a pilot of an airplane, a quarterback in a football game, etc. The known simulating real-time gaming seats are relatively very expensive and have resulted in very limited market development for such entertainment seats.

While the generally known chairs and seats are useful, the remains a need for an entertainment seat to better enhance a user's entertainment and gaming experiences. Video game companies are adding information to software, media and systems to further improve and enhance the realism of the gaming experience. Data are being added to software embedded in DVD's such as for movies that include information that may be processed to move a seat in conjunction with the action in a video used in a movie or game, for example. Entertainment and communication is becoming more immersive. The entertainment industry is seeking new and novel ways of interfacing with a user to provide a higher fidelity of immersive experience—including the concept of feedback and/or touch. Therefore, there remains a need for an entertainment seat that is capable of providing three-dimensional movement that can improve and enhance the entertainment experience while being more flexible, less obtrusive, more easily and compactly stored at a lower cost, and more easily manufactured at a lower cost.

SUMMARY

An exemplary embodiment of the present disclosure relates to an enhanced entertainment seat design and utility, the entertainment seat including a seat base and seat back having a seat architecture utilizing a seat construction providing structural support; armrests fixed to the base of the seat, providing relative movement of the seat to a fixed interface; eliminating the need for structure in the lower portion of the seat; seat motion actuators for seat movement; and a seat motion control system for operating the seat motion actuators. The entertainment seat may be further modified and adapted specifically for gaming.

According to an alternate embodiment, the entertainment seat may be further modified and adapted specifically for gaming. The gaming seat including a seat base and seat back having a seat architecture utilizing a seat construction providing structural support; armrests fixed to the base of the seat, providing relative movement of the seat to a fixed interface; eliminating the need for structure in the lower portion of the seat; seat motion actuators for seat movement; a seat motion control system for operating the seat motion actuators; and a gaming structure for enhancing the gaming experience. The gaming structure includes a first tubular structure and a second tubular structure pivotally coupled to the gaming seat. The first tubular structure provides foot support for the occupant and area to attach gaming interface devices, such as foot pedals. The second tubular structure provides area to attach additional gaming devices, such as joysticks, steering wheels, and the like.

BRIEF DESCRIPTION OF THE DRAWINGS

FIG. 1 is a perspective view of an entertainment seat according to an exemplary embodiment;

FIG. 2 is a perspective view of an entertainment seat with the trim cover, upholstery and cushions removed according to an exemplary embodiment;

FIG. 8A and FIG. 8B is a perspective view of an entertainment seat and an exploded perspective view of entertainment seat cushions, according to an exemplary embodiment;

FIG. 9 is a perspective view of a gaming seat, according to an exemplary embodiment;

FIG. 10 is a perspective view of a gaming seat with the trim cover, upholstery and cushions removed, according to an exemplary embodiment;

DETAILED DESCRIPTION

Figure 3:
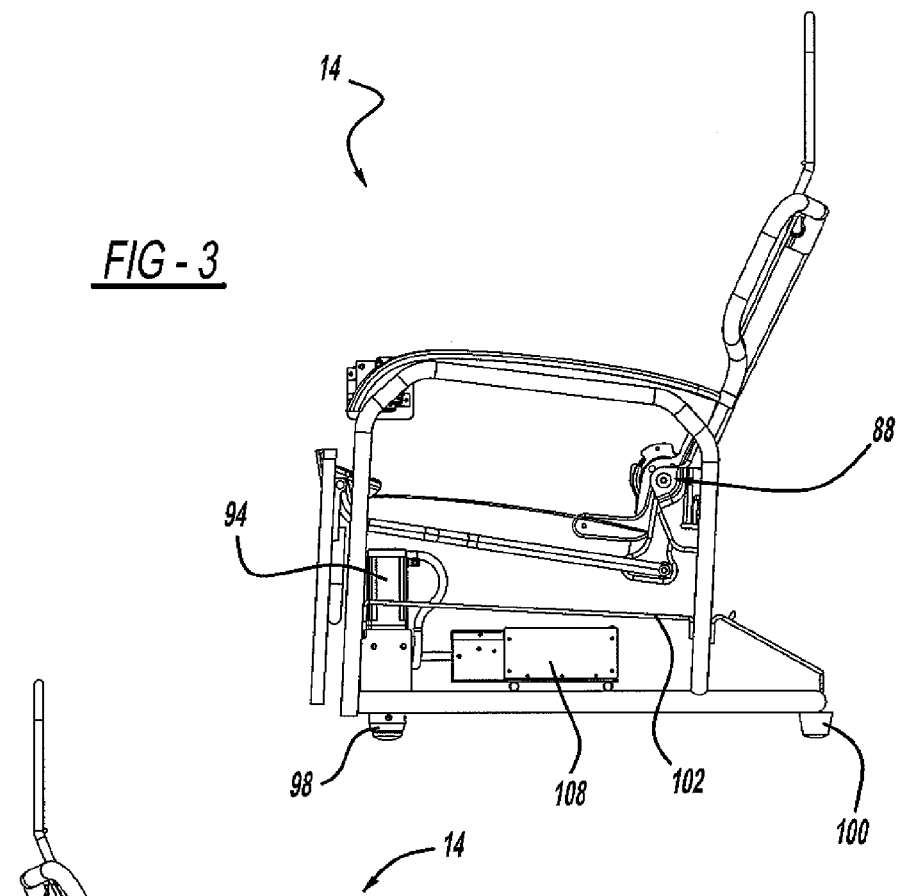
FIG. 3 is a left side view of an entertainment seat with the trim cover, upholstery and cushions removed, according to an exemplary embodiment.

Referring generally to the FIGURES, an entertainment or gaming seat 10, 12 is shown. More particularly, FIGS. 1 through 8 show a seat 10 that has particular use as an entertainment seat such as viewing a video or movie and FIGS. 9 through 21 show a seat 12 that has particular use as a gaming seat for playing games according to exemplary embodiments. Generally, the seat 10, 12 includes, inter alia, a frame structure (Seat Frame Assembly) 14 for providing support, mechanisms for providing adjustment such as for comfort and operational and/or performance adjustments by a motion system 16 for moving the seat 10, 12 interactively with a video or game. One such particularly advantageous motion system is disclosed in U.S. Pat. Nos. 6,662,560; 6,659,773; 6,585,515; and 6,139,324, which are incorporated herein by reference.

Referring now to FIG. 1, a seat 10 is shown that may be used as an entertainment seat such as for viewing a video. The seat 10 includes, inter alia, a seat back 18, a first and second seat back member 20, 22, a seat base 24, a first and second arm rest 26, 28, a first and second side member 30, 32, a first and second side bolster 34, 36, a rear seat back/base member 38, a head restraint 40, leg rest 42 and a control interface 44. The lower portion of the seat back 18 is coupled to the rear portion of the seat base 24. The seat back 18 comprises a first and second seat back member 20, 22 and is straddled by the first and second side bolster 34, 36 to enhance comfort and support for the occupant. The seat base 24 is straddled by the first and second side members 30, 32. The head restraint 40 is coupled to the top portion of the seat back 8. The rear seat back/base member 38 is coupled to the seat base 24 and seat back 18 to cover the rear lower portion of the entertainment seat 10. The leg rest 42 is coupled to the front portion of the seat base 24. The control interface 44 is coupled to the entertainment seat 10 so that the occupant/user may adjust (e.g., seat motion, seat back position, leg rest position, speaker volume, massage, heaters, etc.) the entertainment seat 10 according to their needs and/or desires.

Referring now to FIGS. 2 through 5, a seat frame assembly 14 is shown. The seat frame assembly 14 generally includes, inter alia, a seat back frame member 46, a seat base frame member 48, a first and second arm rest frame member 50, 52, a first and second side frame member 54, 56, a head restraint frame member 58, a leg rest frame member 60 and a recliner mechanism 62. The seat back frame member 46 and the seat base frame member 48 are coupled together via the recliner mechanism 62 and are straddled by the first and second side frame members 54, 56. The first and second arm rest frame member 50, 52 are coupled to the first and second side frame members 54, 56, respectively. The first and second arm rest frame members 50, 52 may be coupled to the side frame members 54, 56 using any suitable structure (e.g., bolts, screws, wire connectors, etc.), technique (e.g., welds, adhesives, etc.), and/or combination thereof. Each side frame member 54, 56 supports each arm rest frame member 50, 52 and extends from the seat base frame member 48. The seat base frame member 48 includes a front cross frame member 64 and a rear cross frame member 66 for forming the seat base (cushion) 24 for supporting an occupant. A plurality of seat base (cushion) support springs (e.g. sinusoidal, etc.) 68 extend between the front and rear cross frame member 64, 66, but any appropriate support structure (e.g., tension material, seat pans, panels, etc.) may be used for supporting the occupant and for attaching the additional structures and materials (e.g., foam, padding, trim cover, etc.).

Toward or on a front portion of the seat 10, a leg rest 60 may be pivotally coupled to the entertainment seat 10 (e.g., the front cross frame member 64, side members 54, 56, etc.) using an appropriate pivot 70 and coupling structure 72 (e.g., bracket, etc.). The leg rest pivot 70 is located proximal to the seat base (cushion) 24 to preferably be located under an occupant's knees—in essence. The leg rest 42 extends substantially across the front of the seat 10 and is pivoted using link member 74 as described below. The leg rest 42 is operated to provide support for the legs of the occupant when the seat 10 is moved toward the recline position.

Figure 4:
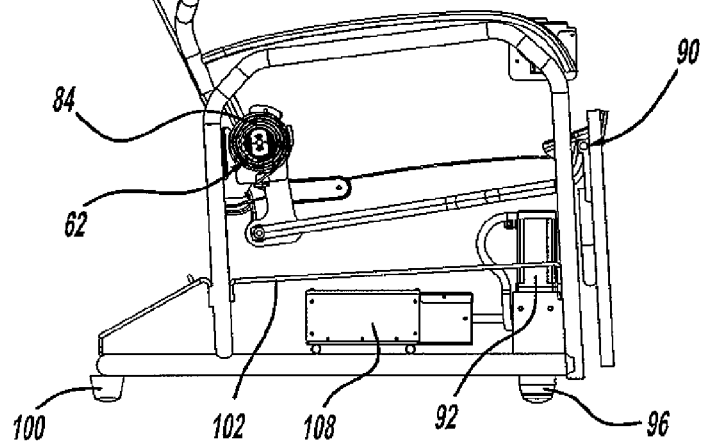
FIG. 4 is a right side view of an entertainment seat with the trim cover, upholstery and cushions removed, according to an exemplary embodiment.
Figure 5:
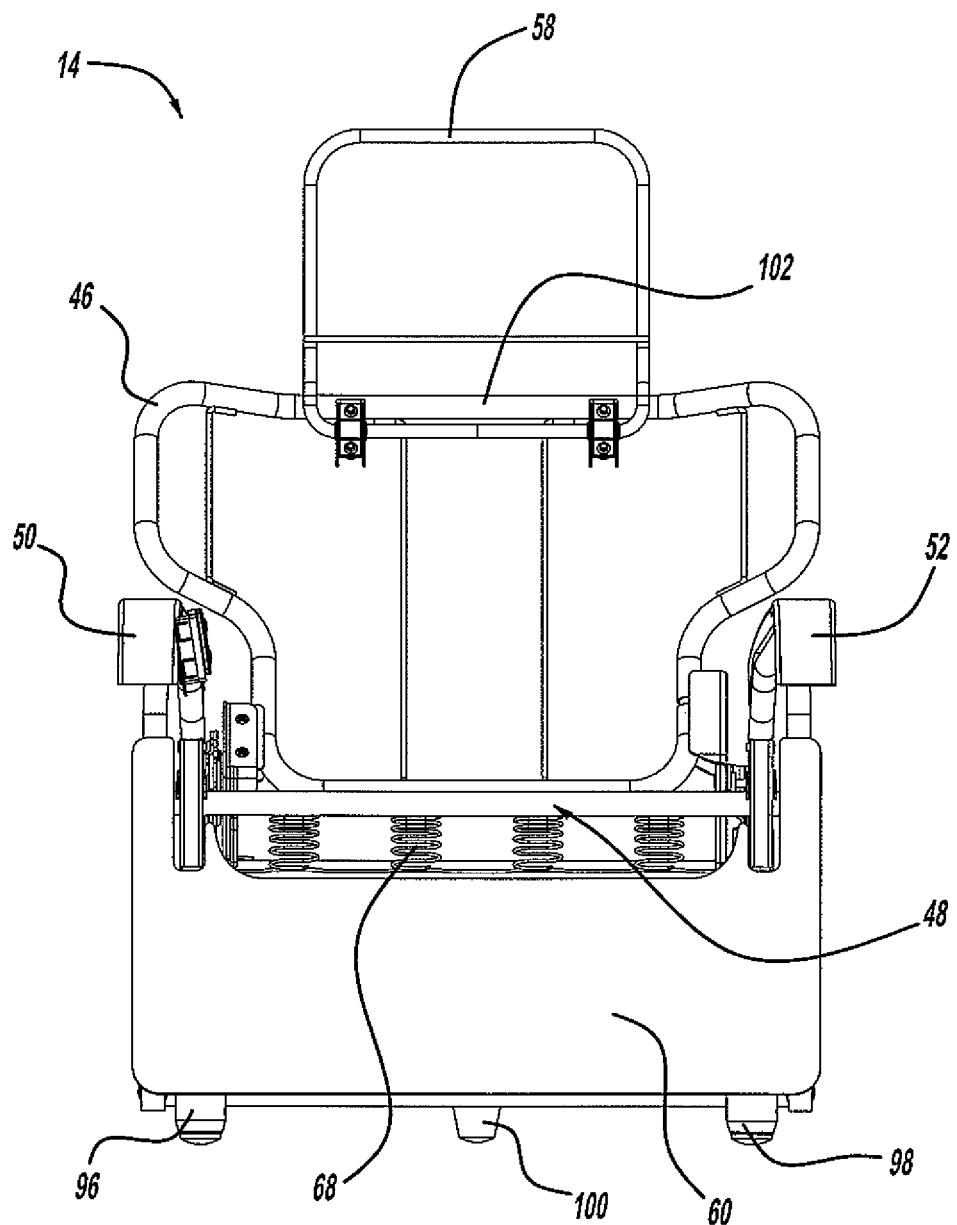
FIG. 5 is a front view of an entertainment seat with the trim cover, upholstery and cushions removed, according to an exemplary embodiment.

The seat back frame member 46 is pivotally coupled to the seat 10. The seat back frame member 46 is a generally a bent and formed tubular frame structure. The seat back frame member 46 includes a first, centrally located pair of vertically extending central cross frame members 76 for providing support to the torso portion of the occupant, preferably via a foam cushion located thereon (not shown). The seat back frame member 46 further includes a second, laterally located pair of vertically extending cross frame members 78 for providing support to the lateral or shoulder areas of the occupant via a foam cushion located thereon, as best shown in FIG. 2. At its lower end, the seat back frame member 46 is pivotally connected to first and second side frame members 54, 56. On the first side, the seat back frame member 46 is coupled to the first side frame member 54 using a simple pivot pin 80 connecting a pair of brackets 82 extending from the seat back frame member 46 and the first and second side frame members 54, 56, respectively. On the other side, the seat back frame member 46 is pivotally coupled to the second side frame member 56 preferably using a recliner mechanism 62 which is capable of locking the seat back frame member 46 at a plurality of incremental rotational locations such as by using a discontinuous recliner mechanism 62. Alternatively, the recliner mechanism 62 may be a free-pivoting device which provides a tensioned recline adjustment. In either embodiment, the rotation of the seat back frame member 46 via the recliner mechanism 62 is preferably, and alternatively, balanced using a biasing device 84 (e.g., clock-type spring, etc.), as best shown in FIG. 4.

On at least one side of the seat back frame member 46 is an extension bracket 86. The extension bracket 86 pivots about the pivot of the seat back frame member 46 and is coupled to the link member 74. The link member 74 extends laterally and distally from a location proximal the seat back frame member 46 to a location near the front of the seat 10. The link member 74 has one end coupled to the extension bracket 86 and another end coupled to the leg rest 42. The link member 74 moves when the extension bracket 86 rotates to pivot the leg rest 42 from a retracted position to a reclined position. The particular design provides for a leg rest 42 having a maximized length (or height depending upon its orientation) while avoiding the use of a scissor-type leg rest extender.

The seat back 18 and link member 42 further include a lost motion device 88 which allows the seat back 18 to pivot a predetermined amount (preferably about ten to twenty-five degrees of rotation from vertical) without the leg rest 42 being driven by the link member 74. Once the lost motion is depleted, the link member 74 begins to drive the leg rest 42 up. The link member 74 is designed to drive the leg rest 42 from its vertical, stowed position to its horizontal, deployed position (about ninety degrees of leg rest rotation) through about thirty degrees of seat back 18 rotation. A biasing mechanism 90 (e.g., spring, etc.) is used to apply a preferably continuous force to the leg rest 42 in the vertical, stowed position.

Figure 6:
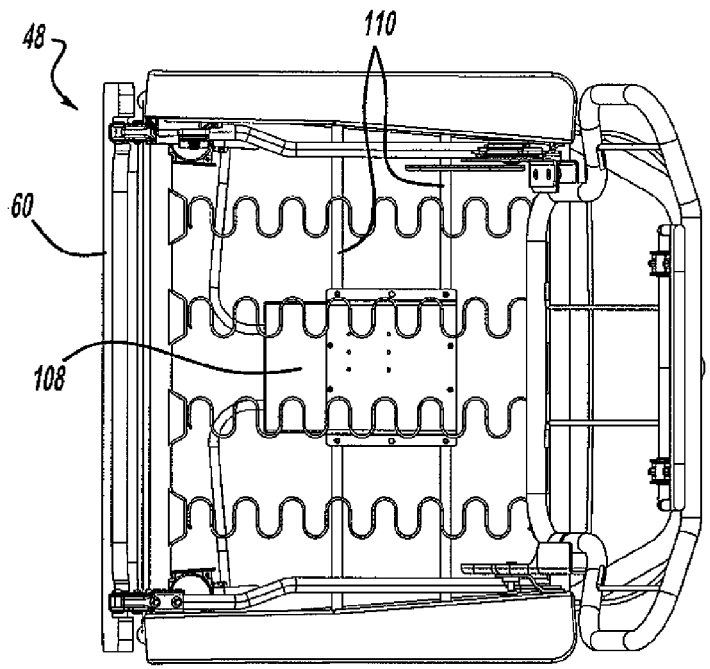
FIG. 6 is a top view of a seat base of an entertainment seat with the trim cover, upholstery and cushions removed, according to an exemplary embodiment.
Figure 7:
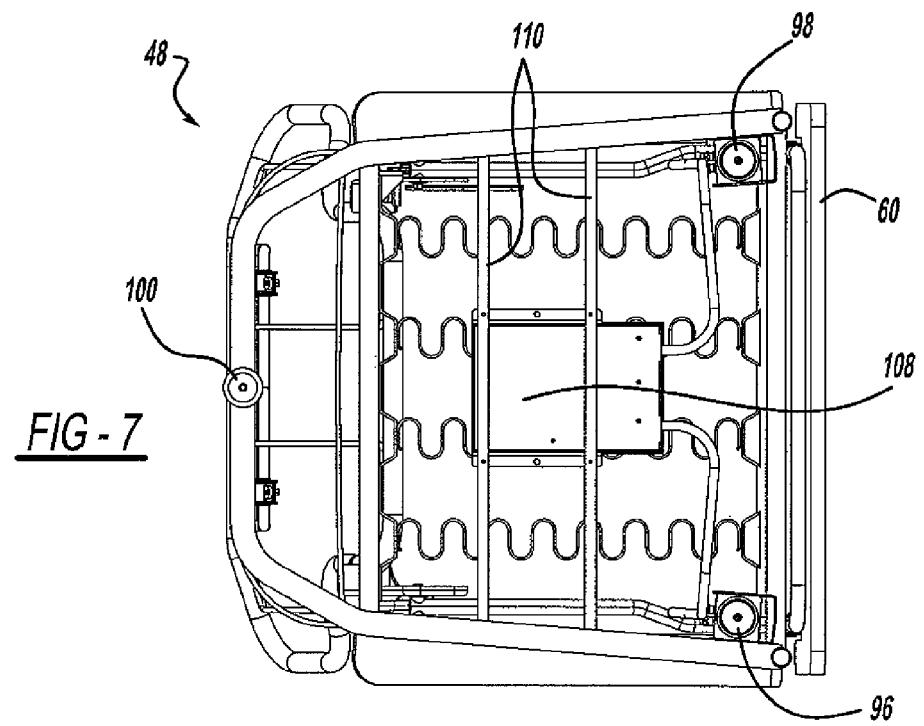
FIG. 7 is a bottom view seat base of an entertainment seat with the trim cover, upholstery and cushions removed, according to an exemplary embodiment.
Figure 11:
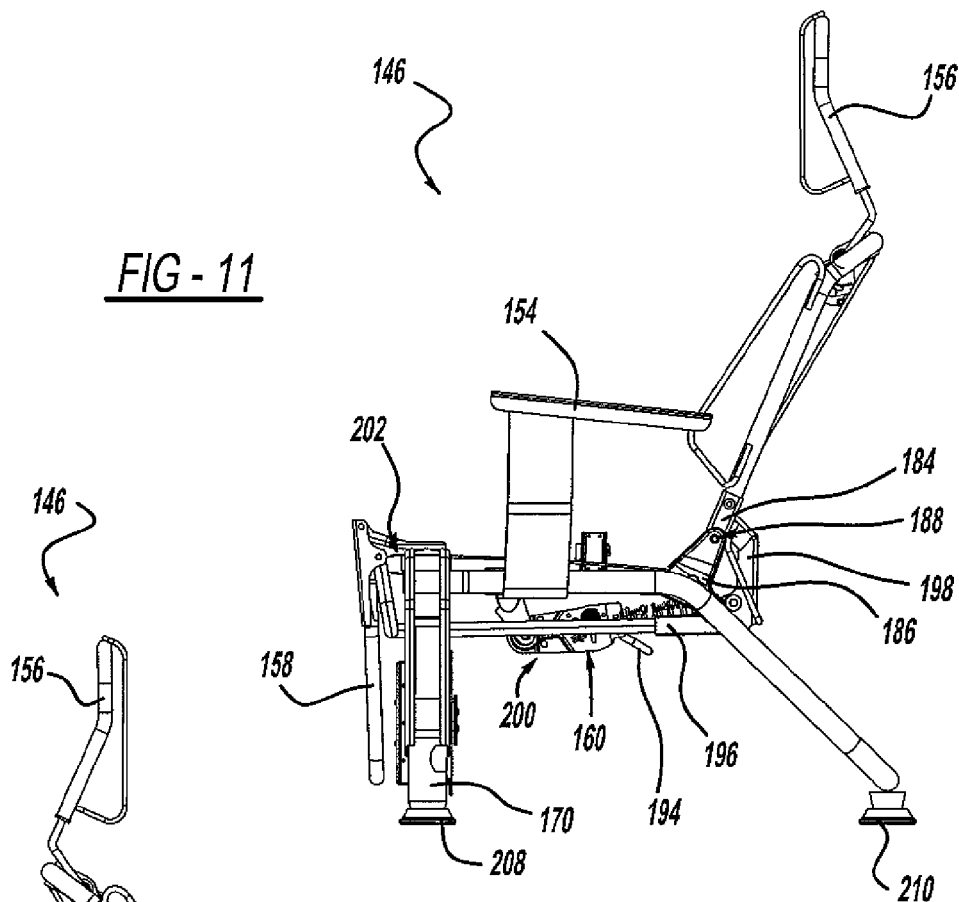
FIG. 11 is a left side view of a gaming seat with the trim cover, upholstery and cushions removed, according to an exemplary embodiment.

Referring now to FIGS. 6 and 7, a seat base frame member 48 is shown. The seat base frame member 48 includes only three points of contact with a support surface (e.g., floor, etc.) where the seat 10 is used. Toward the front of the seat 10, first and second front-side motion actuators 92, 94 each include a support surface engaging member 96, 98. Toward the rear of the seat 10, a preferably fixed and centrally located support surface engaging member 100 is provided and preferably extends vertically downward from the seat base frame member 48. In the un-activated position, as shown in FIGS. 6 and 7, the three support surface engaging members 96, 98, 100 are aligned in a substantially horizontal plane and an occupant of the seat 10 is substantially oriented in a traditional seating position.

The seat base frame member 48 further includes a cross support member 102 extending laterally across the seat 10 from one side frame member 54 to the other side frame member 56 angularly to the seat base frame member 48 to provide support and stiffness to the seat frame assembly 14 and for transferring and managing load forces of the occupant while the motion system 16 is operating.

The seat 10 also preferably includes a head rest frame member 58 for the occupant's use and head support. The head rest frame member 58 is preferably pivotally coupled to the seat back frame member 46 at an upper cross frame member 102 using any known or appropriate coupling (e.g., brackets, pivot pin, etc.). The head rest frame member 58 is preferably and alternatively adjustable by the occupant during operation of the entertainment seat 10 between a range of comfortable positions.

Each side frame member 54, 56, toward the front of the seat 10, includes a motion actuator 96, 98 of the motion system 16. The motion actuators 96, 98 are preferably fixedly coupled to a vertical portion of the side frame members 54, 56. Alternatively, the motion actuators 96, 98 may be removably coupled to the side frame members 54, 56 provided that the motion of the motion actuators 96, 98 is transferred to the seat 10. The motion actuators 96, 98 are preferably positioned within an internal area of the seat base frame 48, as best shown in FIGS. 2 through 5.

By fixing an interface to a structure of the seat 10 (e.g., arm rest, etc.) and providing relative movement of the entertainment seat 10 to a fixed interface (not shown in FIGS. 1 through 8), an opportunity exists to virtually "touch" and provide moving contact to a user.

It will be understood that as the motion actuators 92, 94 operate, they push against the support surface (e.g., floor) to raise that portion of the seat 10. Since the motion actuators 92, 94 are located toward the sides and toward the front of the seat 10, and there is only a single, central pivot in the rear of the seat 10, the seat 10 is designed to pivot about the third, rear, support surface engaging member 100. It has been discovered that this arrangement provides a lower cost motion seat 10 while still providing a substantial, and nearly equivalent, motion effect as compared to a four motion actuator system where there is an actuator at each corner of the motion seat.

Notwithstanding the above, it should be noted that the spacing of the motion actuators 92, 94 of the motion system 16 and the third support surface engaging member 100 are chosen to enhance the performance of the motion system 16. The spacing is optimized to maximize the entertainment experience of the motion system 16 while the geometry of the seat 10 and the spacing is further optimized to increase the stability of the system during intended operating conditions. The location of the motion actuators 92, 94 for such a system is best in the front of the seat 10 to provide the occupant with increased sensation of pitch (front to back) motion of the seat 10. The lateral spacing of the motion actuators 92, 94 was determined to be between approximately 530 and 700 mm while the spacing from a line through the front motion actuators 92, 94 and the third support member 100 is between approximately 550 and 680 mm. More particularly, the lateral spacing of the motion actuators 92, 94 was determined to be between approximately 570 and 615 mm while the spacing from a line through the front motion actuators 92, 94 and the third support member 100 is between approximately 640 and 660 mm. Even more particularly, the lateral spacing of the motion actuators 92, 94 was determined to be approximately 600 mm while the spacing from a line through the front motion actuators 92, 94 and the third support member 100 is approximately 660 mm.

An operation or motion intensity control (switch) interface 44 for the occupant to control the operation and preferences of the motion system 16 is provided toward the front portion and on the internal side near or on one arm rest 50, 52. The interface 44 is preferably located on a vertical side frame member 104, 106 of the one side frame 54, 56 and is coupled thereto using any appropriate structure including fasteners or the like such that it is fixedly or removably coupled. The location provides the occupant with a better ability to more simply locate and control the motion actuators 92, 94.

The motion system 16 further includes a main control unit 108, preferably located in a box-like structure within the interior area of the seat 10. In particular, the main control unit 108 is connected to a pair of cross members 110 extending from one side frame member 54 to the other side frame member 56. Appropriate electrical connections extend from the main control unit 108 to the actuators 92, 94 and an appropriate power supply connection is provided (such as a power cord—not shown).

Referring now to FIG. 8, the foam cushions 112 and finished side members of the entertainment seat are shown. In particular, it should be noted that the side members 114, 116 are formed from two pieces, an internal side finish member 118 and an external side finish member 120 to provide an integrated armrest 122 and closeout feature for side facings of the entertainment seat 10. In particular, a structural foam material is appropriately selected and utilized for the internal side finish member 118 and the external side finish member 120. The structural foam 112 and designs as shown provide for integrated attachment features for coupling the internal side finish member 118 and the external side finish member 120 to the side frame members 54, 56. The above provides an appropriate appearance, an appropriately functioning and comfortable arm rest 122 portion and a relatively low cost, easy to assemble arm and side structures 114, 116.

The seat back 18 of the entertainment seat 10 is preferably also constructed of a two piece seat back cushion 18. A first piece of the seat back cushion 18 is a seat back base member 22 that covers a central portion of the seat back 18 and includes cushioned side bolsters 34, 36 for covering and cushioning the sides of the seat back frame member 46. The central portion of the seat back base member 22 is a relatively thin member having very little or no foam cushion material. A second piece of the seat back cushion 18 is central, top foam cushion member 20 designed to be located between the side bolsters 34, 36 of the central seat back base member 22. The central, top foam cushion member 20 also preferably, but optionally, includes a foam cushion 112 and cover for the head restraint 40 of the seat back 18. Referring to FIG. 8, this construction results in a lay on insert and head rest cushion assembly 18 for the back cushion 18 which provides an appropriately functioning and improved comfort seat back 18 at an advantageously, relatively low cost that is easy to assemble. This assembly 18 results in the fasteners that are used to couple the seat back base member 22 to the seat back frame member 46 being easily covered by the central, top foam cushion member 20. The above construction makes it possible to ship the seat 10 with the back frame member 46 disassembled and for the a consumer to couple the seat back frame 46 to the seat 10 and to then easily install the seat back base member 22 on the seat back frame member 46 and then easily install the central, top foam cushion member 20. Separation of the seat back frame member 46 and the central, top foam cushion member 20 makes it possible to easily utilize a slab foam insert for the central, top foam cushion member 20 for providing improved comfort at a lower cost and for providing a seat back frame member 46 optionally made from a poured foam product.

Referring now to FIG. 9, a seat 12 having particular application as a gaming chair or seat such as for playing a first person shooter or driving game (for example) is shown according to one exemplary embodiment. The seat 12 includes a seat back 124, seat base 126, a first and second arm rests 128, 130, a first and second side bolster 132, 134, a head restraint 136, and a leg rest 138. The lower portion of the seat back 124 is coupled to the rear portion of the seat base 126. The seat base 126 is straddled by the first and second arm rest 128, 130 and the head restraint 136 is coupled to the top portion of the seat back 124. The leg rest 138 is coupled to the front portion of the seat base 126. The gaming seat 12 is disclosed as a three legged gaming seat 12 having a front pair of legs 140, 142, laterally spaced across the front of the gaming seat 12 and a third centrally located rear leg 144 extending rearwardly and down from the seat area of the gaming seat 12.

Referring now to FIGS. 10 through 13, a gaming seat frame assembly 146 is shown. The seat frame assembly 146 generally includes, inter alia, a seat back frame member 148, a seat base frame member 150, a first and second arm rest frame member 152, 154, a head restraint frame member 156, a leg rest frame member 158 and a recliner mechanism 160. The seat base (cushion) support frame member 150 includes a front cross frame member 162 which is aligned under the knees of an occupant and a rear cross frame member 164.

A plurality of support springs (e.g., sinusoidal) 166 extend between the front and rear cross frame members 162, 164 but any appropriate structure may be used for supporting the occupant and for attaching and supporting the foam cushion and trim cover structures 168.

In the exemplary embodiment of three legged gaming seat 12, the motion actuators 170, 172 of the motion system 174 are utilized as the front legs 140, 142 and are connected directly to a base frame support member 150 which forms the sides frame members 176, 178 of the central seat cushion support frame portion 150 and then extends rearwardly and downwardly to form the rear support member or third leg 144 of the gaming seat 12. The seat base frame member 150 is preferably, and optionally a single piece, bent tubular frame member which has a first end coupled to one motion actuator 170 and a second end coupled to the other motion actuator 172. Optionally, base frame member 150 may be a plurality of parts that are coupled and/or assembled.

The seat back frame member 148, which is preferably, but optionally, pivotally coupled to the base frame member 150 proximal a location near the back of the central cushion support frame portion 150 where the side portions of the base frame member 150 bend rearwardly and downwardly. The seat back frame member 148 is a generally bent and formed, tubular member, preferably, but optionally, having a generally round cross-section. The seat back frame member 148 includes a centrally located pair of vertically extending cross frame members 180 for providing support to the central area of the occupant via the foam cushion 168 located thereon. The seat back frame member 148 further includes a second, laterally located pair of vertically and laterally, angularly extending wing cross frame members 182 for providing support to the lateral or shoulder areas of the occupant via the foam cushion 168 located thereon, as best shown in FIG. 10.

Each side of the seat back frame member 148 preferably, but optionally, includes an extension bracket 184 for pivotally coupling the seat back frame member 148 to preferably, but optionally, a respective pair of extension brackets 186 connected to the base frame member 150. Each side of the seat back frame member 148 preferably, but optionally, includes a simple pivot connection 188. The gaming seat 12 includes a foldable leg rest (support) 158 connected to align with and extend from a front edge of the seat cushion portion 126.

Figure 12:
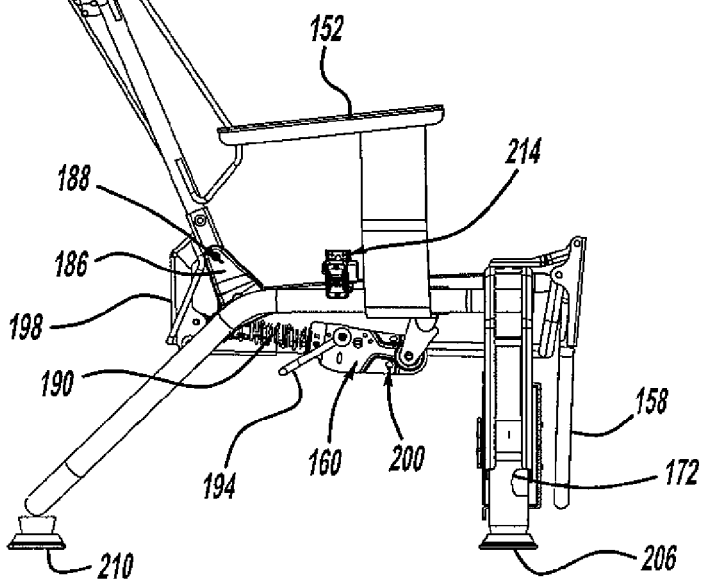
FIG. 12 is a right side view of a gaming seat with the trim cover, upholstery and cushions removed, according to an exemplary embodiment.
Figure 13:
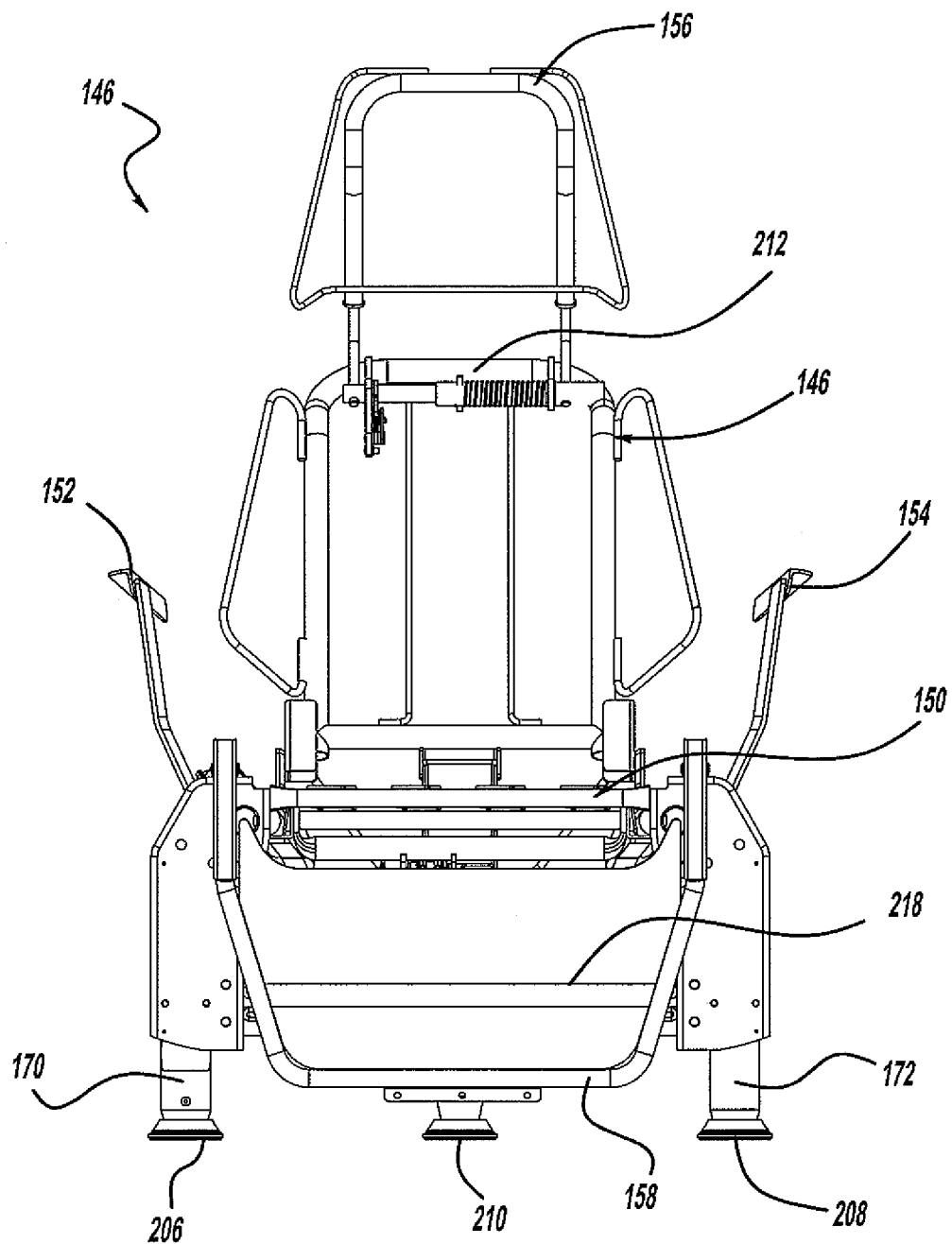
FIG. 13 is a front view of a gaming seat with the trim cover, upholstery and cushions removed, according to an exemplary embodiment.
Figure 14:
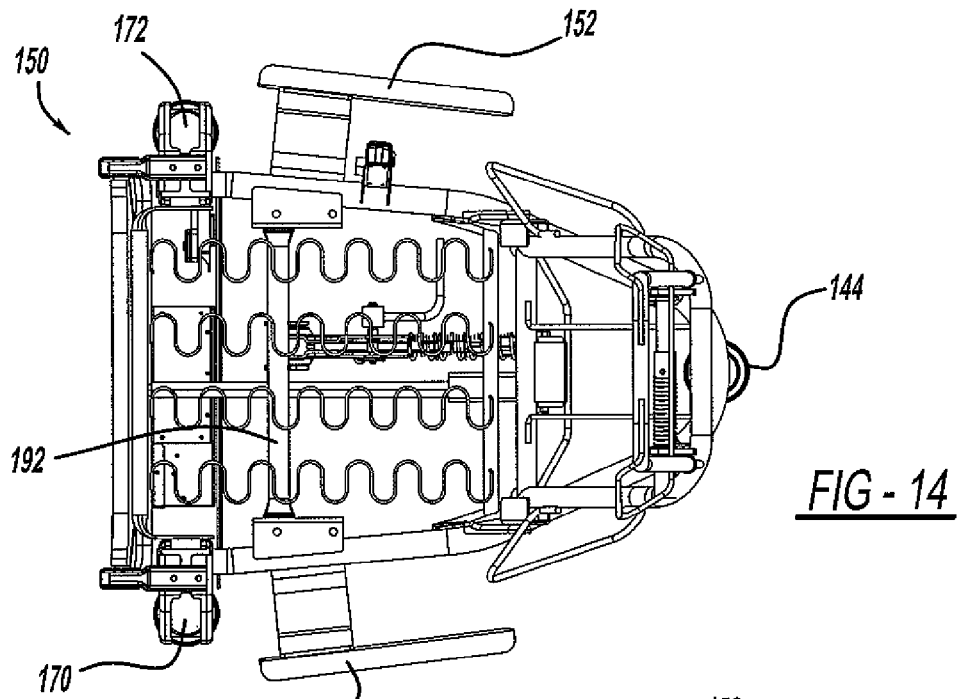
FIG. 14 is a top view of a seat base of a gaming seat with the trim cover, upholstery and cushions removed, according to an exemplary embodiment.
Figure 15:
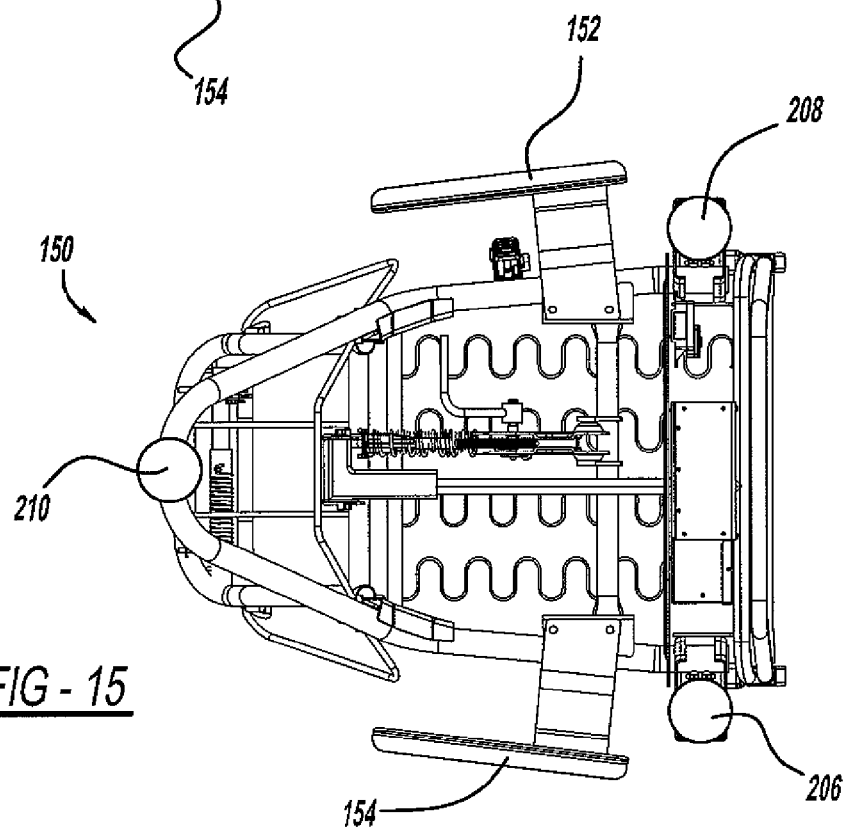
FIG. 15 is a bottom view of a seat base of a gaming seat with the trim cover, upholstery and cushions removed, according to an exemplary embodiment.
Figure 16:
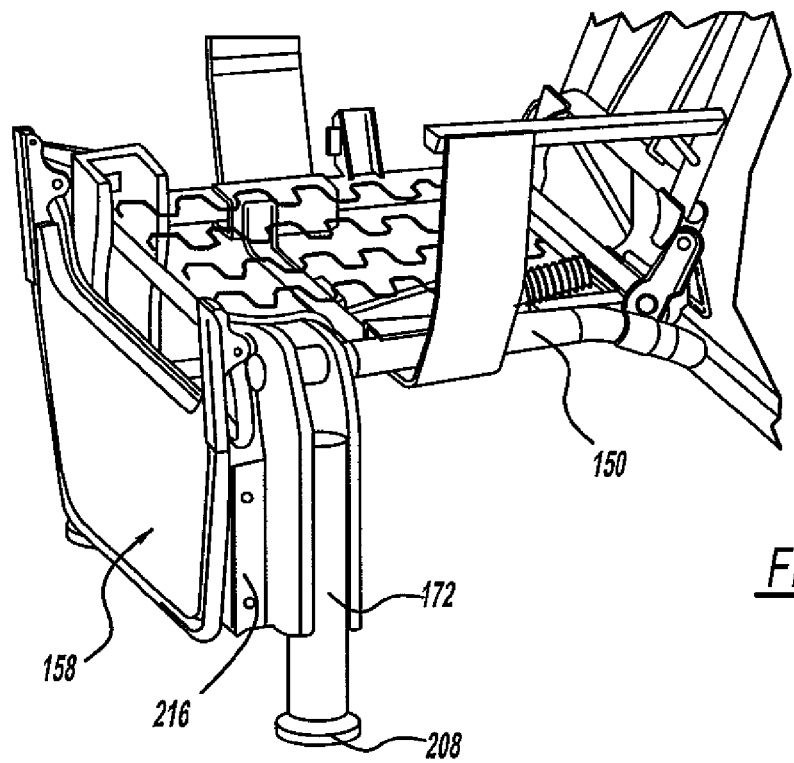
FIG. 16 is an enlarged view of the leg rest of the gaming seat in a retracted position, according to an exemplary embodiment.
Figure 17:
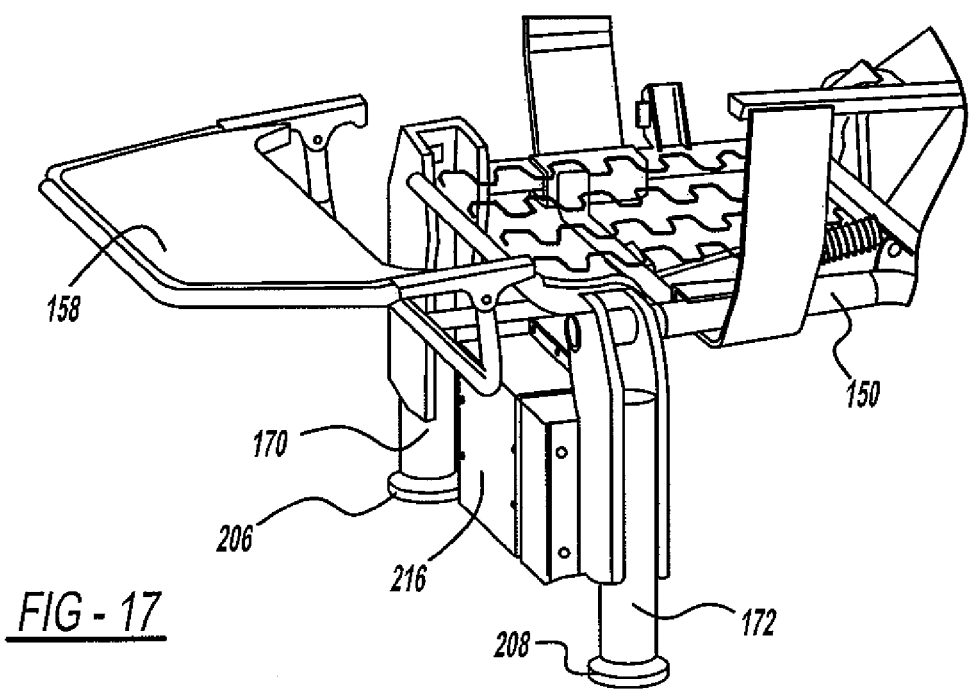
FIG. 17 is an enlarged view of the leg rest of the gaming seat in a reclined/extended position, according to an exemplary embodiment.

The seat back frame member 148 is pivotally coupled to pivot with respect to the base frame member 150 using the simple pivots and against the action of a recliner mechanism 160 located under the seat cushion area 126 and including a biasing member 190 (e.g., compression spring, etc.). This optimally eliminates the inclusion of a recliner mechanism 160 at an outboard portion of the pivot area of the seat back pivot 188. The recliner mechanism 160 is interposed in the seat base frame member 150 and a central cross frame support member 192 aligned with the arms 152, 154 of the gaming seat 12, as best shown in FIGS. 12, 14 and 15. The recliner mechanism 160 includes an actuator 194 for releasing the recliner mechanisms 160 and allowing the seat back frame member 148 to pivot and lock the position of the seat back 124 when the actuator 194 is released.

Still referring to FIGS. 10 through 17, the gaming seat 12 preferably, but optionally, includes on each side of the central seat portion 150, a fixed arm rest 128, 130 that may be coupled to the frame structure 146. Each arm rest 128, 130 may be coupled (removably or fixedly) using any appropriate structure including bolts, screws, welds, etc. or any combination thereof. The arm rest 128, 130 may have any know or appropriate structure for supporting the arms of the occupant.

Toward or on the front portion of the seat 12, a leg rest frame member 158 may be pivotally coupled to the gaming seat 12 (e.g., front cross frame member 162, side members 176, 178, etc) using an appropriate pivot and coupling structure. This positions the leg rest pivot very close to the seat cushion 126 (i.e., under the occupant's knee). The leg rest member 158 extends substantially across the front of the seat 12 and is pivoted using a link member 196 as described below. The leg rest 138 is operated to provide support for the legs of the occupant when the seat 12 is moved toward the recline position.

On the back of the lower cross frame member 164 of the seat back frame 148, there is an extension bracket 198 for connection with the link member 196. The extension bracket 198 rotates with the seat back 148 and pivots about the pivot of the seat back frame member 148 and is connected to the link member 196. The link member 196 extends laterally and distally from a location proximal the seat back frame 148 to a location near the front of the seat 12. The link member 196 has one end coupled to the extension bracket 198 and seat back frame 148 and another end coupled to the leg rest 158. The link member 196 moves when the seat back frame 148 rotates to cause the leg rest 158 to pivot between a refracted position to an extended position as the seat back frame member 148 pivots from a seated position to a reclined position. The particular design provides for a leg rest 138 having a maximized length (or height depending upon its orientation) while avoiding the use of a scissor-type leg rest extender.

The gaming seat 12 further preferably, but optionally, includes a lost motion device 200 as part of the recliner mechanism 160 which allows the seat back 124 to pivot a predetermined amount (preferably about 10 to 25 degrees of rotation from vertical) without the leg rest 138 being driven by the link member 196. Once the lost motion is depleted, the link member 196 begins to drive the leg rest 138 up. The link member 196 is designed to drive the leg rest 138 from its vertical, stowed position to its horizontal, deployed position (about ninety degrees of leg rest rotation) through about thirty degrees of seat back rotation. A biasing mechanism 202 (e.g., spring, etc.) is used to apply a preferably continuous force to the leg rest 138 in the vertical, stowed position.

The seat base frame member 150 includes only three points of contact with a support surface (floor) where the seat 12 is used. Toward the front of the seat 12, first and second front-side motion actuators 170, 172 each include a support surface engaging member 206, 208. Toward the rear of the seat 12, a preferably fixed and centrally located support surface engaging member 210 is provided and preferably extends from the seat base frame member 150 vertically downward. In the neutral position, as best shown in FIGS. 9 through 13, the three support surface engaging members 206, 208, 210 are aligned in a substantially horizontal plane and an occupant of the seat 12 is substantially oriented in a traditional seating position.

The seat 12 also preferably includes a head rest 136 for the occupant's use and support. The head rest frame member 156 is preferably pivotally coupled to the seat back frame 148 at an upper cross frame member 212 using any known or appropriate coupling. The head rest 136 is preferably and alternatively adjustable by the occupant during operation of the gaming seat 12 between a range of comfort positions using any known or appropriate adjuster.

It should be understood that as the motion actuators 170, 172 operate, they push against the support surface to raise that portion of the seat 12. Since the actuators 170, 172 are located at the sides and toward the front of the seat 12, and there is only a single central pivot in the rear of the seat 12, the gaming seat 12 is designed to pivot about the third, rear, support surface engaging member 210. This arrangement provides a lower cost gaming seat 12 while still providing a substantial motion effect as compared to a four motion actuator system where there is an actuator at each corner of a seat.

Notwithstanding the above, the spacing of the motion actuators 170, 172 of the motion system 174 and the third support surface engaging member 210 are chosen to enhance the performance of the motion system 174. The spacing is optimized to maximize the entertainment experience of the motion system 174 while the geometry of the seat 12 and the spacing is further optimized to increase the stability of the system 174 during intended operating conditions. The location of the motion actuators 170, 172 for such a system 174 is best in the front of the seat 12 to provide the occupant with increased sensation of pitch (front to back) motion of the seat 12. The lateral spacing of the motion actuators 170, 172 was determined to be between approximately 530 and 700 mm while the spacing from a line through the front motion actuators 170, 172 and the third support member 210 is between approximately 550 and 680 mm. More particularly, the lateral spacing of the motion actuators 170, 172 was determined to be between approximately 570 and 615 mm while the spacing from a line through the front motion actuators 170, 172 and the third support member 210 is between approximately 640 and 660 mm. Even more particularly, the lateral spacing of the motion actuators 170, 172 was determined to be approximately 600 mm while the spacing from a line through the front motion actuators 170, 172 and the third support member 210 is approximately 660 mm.

An operation or motion intensity control (switch) interface 214 for the occupant to control the operation and preferences of the motion system 174 is provided toward the front portion and on the outer side proximal one arm rest 128, 130 and on the external side of the gaming seat 12 as best shown in FIGS. 12 and 15. The interface 214 is preferably located on the seat base frame member 150 and is coupled thereto using any appropriate structure including fasteners or the like such that it is fixedly or removably coupled. The location provides the occupant with a better ability to more simply locate and control the motion actuators 170, 172.

The motion system 174 further includes a main control unit 216, preferably, but optionally, located in a box-like structure within the interior area and under of the seat 12. In particular, the main control unit 216 is connected to a cross member 218 extending from one motion actuator 170 to the other motion actuator 172 but may alternatively extend from one side frame member 176 to the other side frame member 178. Appropriate electrical connections extend from the main control unit 216 to the motion actuators 170, 172 and an appropriate power supply connection is provided (such as a power cord—not shown).

Figure 18:
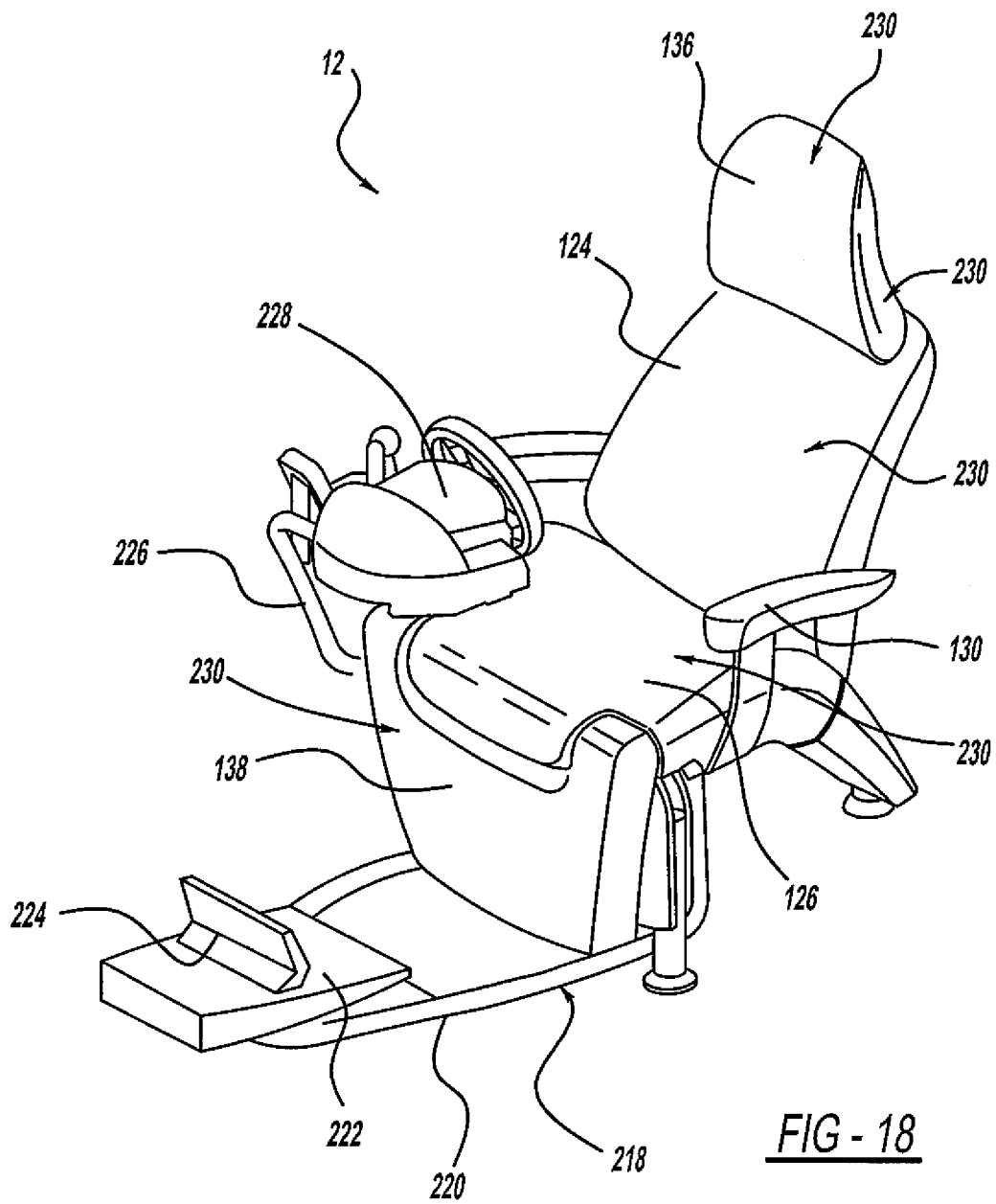
FIG. 18 is a left side perspective view of a gaming seat having a gaming structure, according to an exemplary embodiment.
Figure 19:
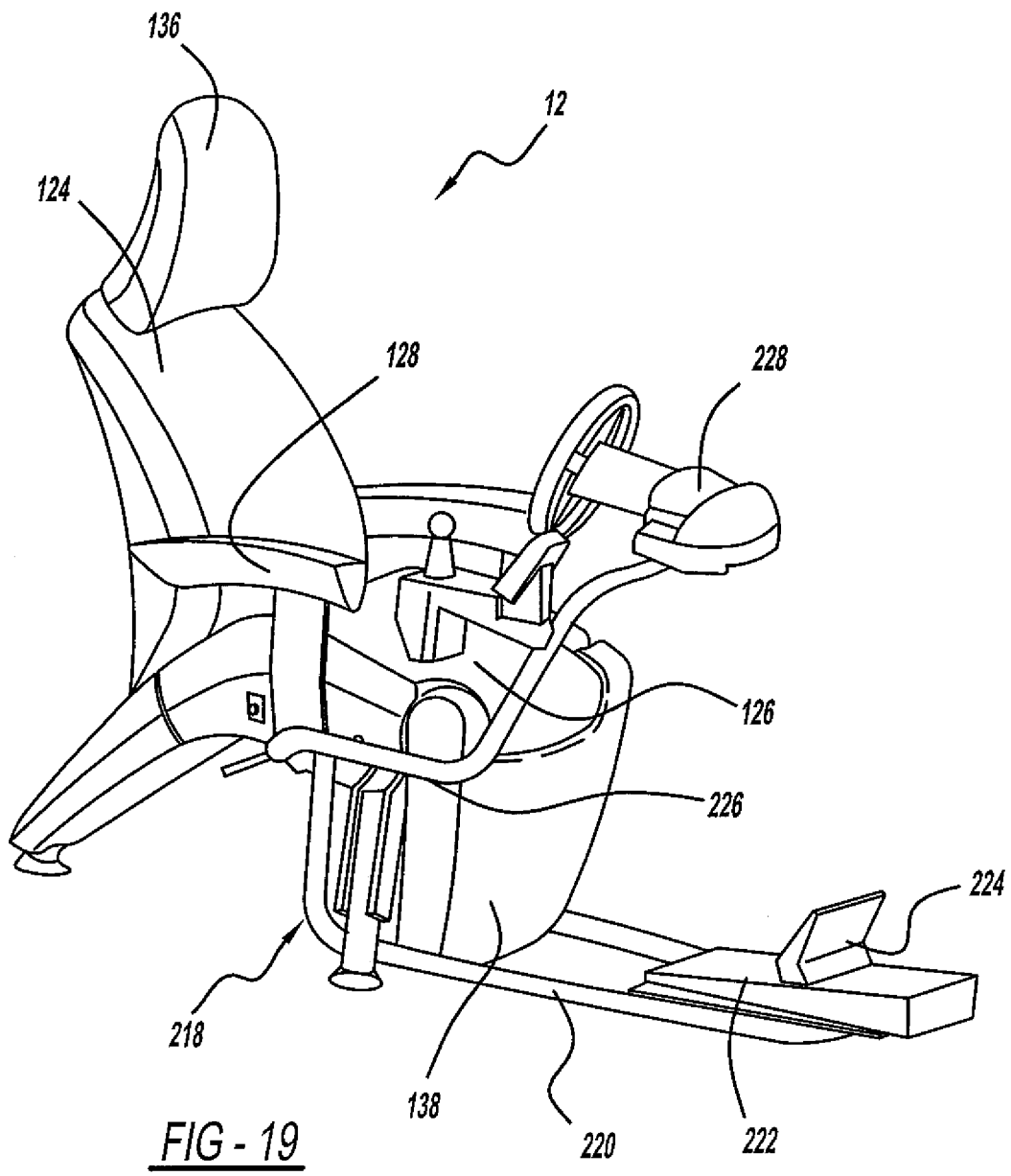
FIG. 19 is a right side perspective view of a gaming seat having a gaming structure, according to an exemplary embodiment.
Figure 20:
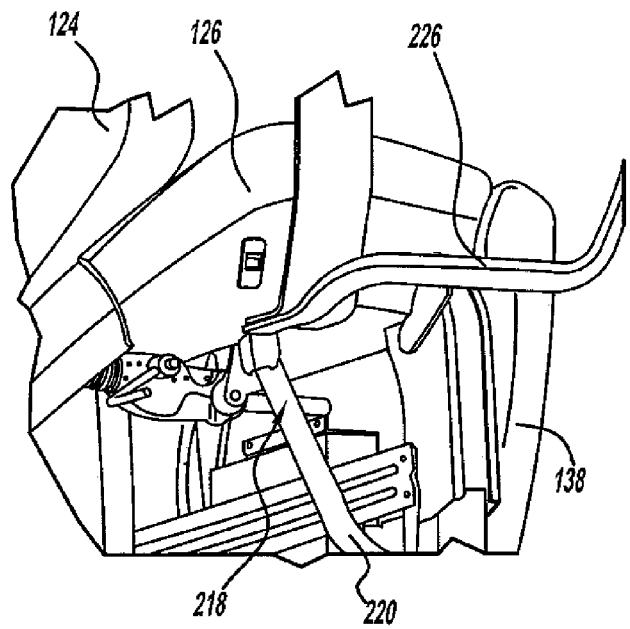
FIG. 20 is a partial enlarged right side perspective view of a gaming structure coupled to a gaming seat, according to an exemplary embodiment.
Figure 21:
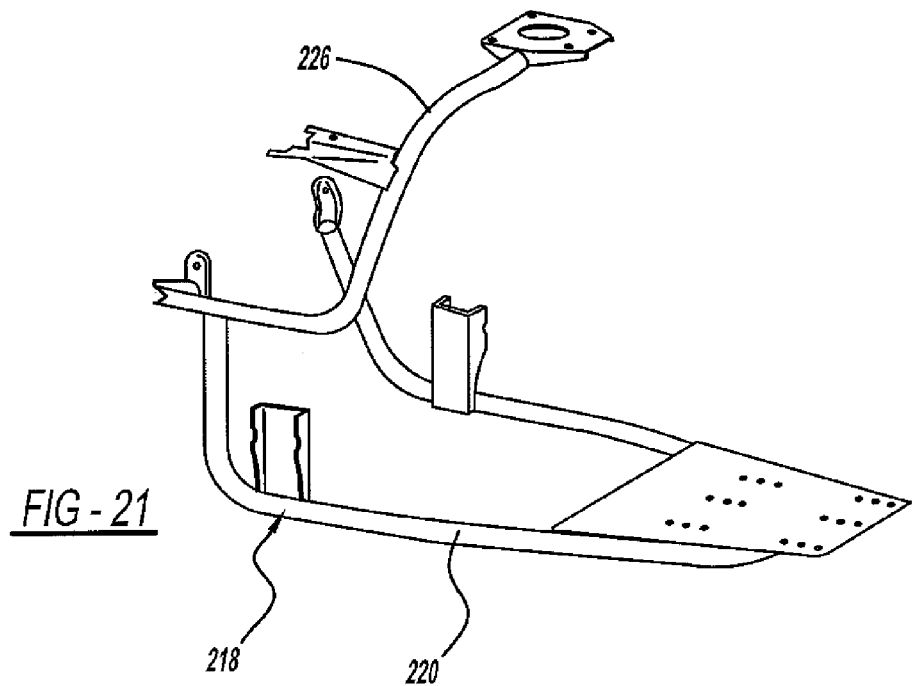
FIG. 21 is a right side perspective view of a gaming structure, according to an exemplary embodiment

Referring now to FIGS. 18 through 21, the gaming seat 12 of the present disclosure in one exemplary embodiment includes a gaming structure 218 which is connected to the gaming seat 12 proximal the arm rests 128, 130 as best shown in FIGS. 18 and 19. The gaming structure 218 is preferably, but optionally, a one piece tube (a first tubular structure) 220 bent in a substantially complex U-shape to provide a foot support 222 including for use in supporting a first gaming interface device 224 (e.g., foot pedals, etc.). A second tubular structure 226 is connected on one side of the gaming structure 218 for use in presenting a second gaming interface device 228 for hand use by the occupant (e.g., joystick, steering wheel, display, controls, etc.). The second tubular structure 226 is preferably pivotally coupled to allow it to be moved close to the occupant in the gaming seat 12 and to move away from the occupant to allow simple egress and ingress from and to the gaming seat 12.

The construction of the gaming seat 12 preferably, but optionally, makes it possible to ship the gaming seat 12 with the back frame member 148 disassembled and for the consumer to install the seat back base member 124 on the seat back frame member 148 and then optionally install the seat back foam cushion member 230. The foam cushion members 230 preferably, but optionally utilize a slab foam insert for the foam cushion members 230 for providing improved comfort at a lower cost and may optionally be a poured foam product.

It should be understood that in an alternate exemplary embodiment the seats 10, 12 may be modified to include different functionality and enhancing components such as speakers, cup holders, seat heaters, MP3 connections, seat massagers, etc. It should also be noted that alternatively, the seats 10, 12 may include, inter alia, a directly connected viewing screen/display and/or a control support or bar.

The seats 10, 12 may be constructed/designed to have any size, dimension, shapes, etc. and be covered and/or filled with any suitable material (e.g., leather, vinyl, woven or non-woven fabric, pleather (faux leather), foam, etc.) to further enhance aesthetics and comfort. The exterior and/or trim of the seats 10, 12 may be modified to accommodate any variety of decorative trim components including color schemes, sports themes and movie themes etc. that may be desired for decorative and/or functional purposes. Accordingly, the seats 10, 12 may alternately be decorated to be used in a movie theater, an amusement park, a private residence, a game arcade, an airplane, a space ship, a seat in an automobile or truck, etc.

Figure 22:
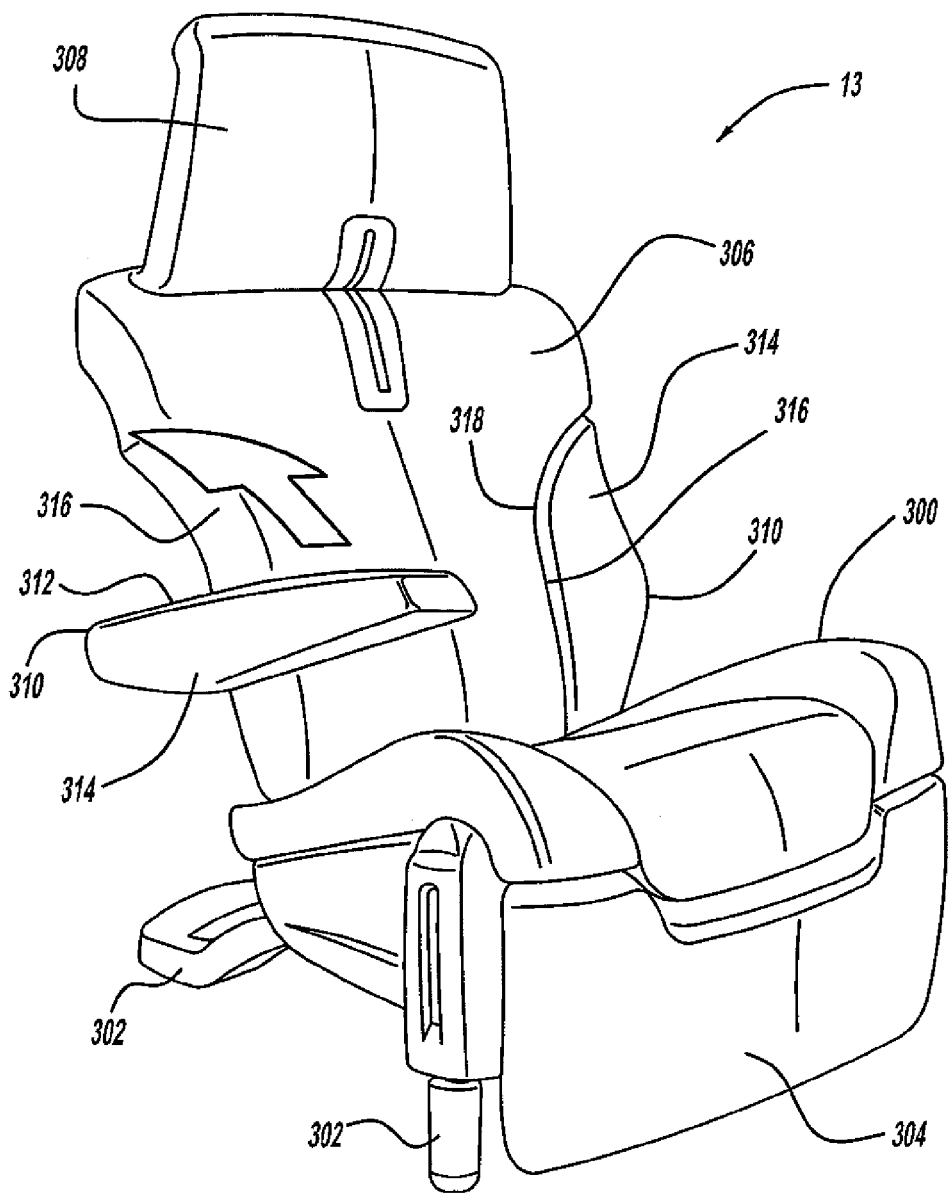
FIG. 22 is a perspective view of an entertainment seat assembly having one integral arm rest in an extended, use position and the other integral arm rest in a retracted, non-use position, according to an exemplary embodiment.
Figure 23:
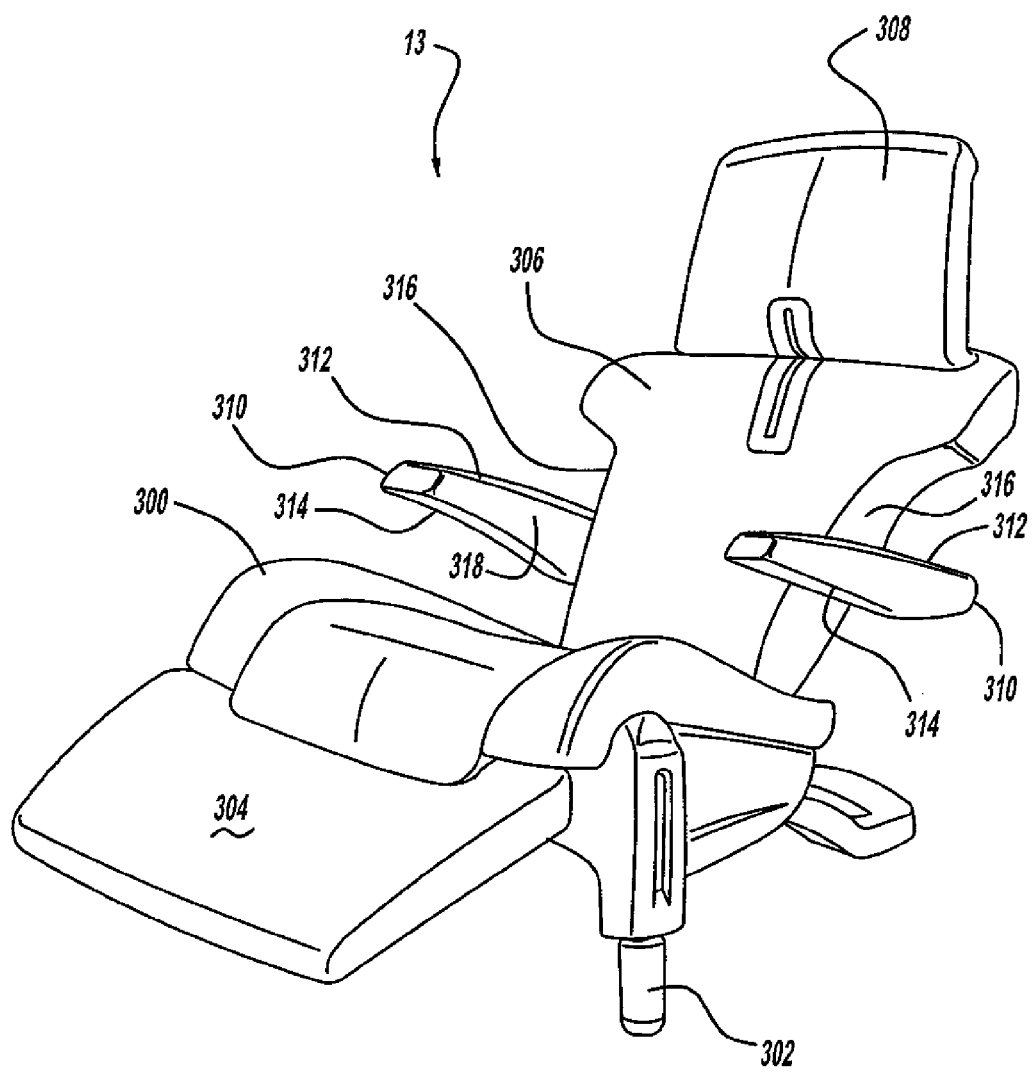
FIG. 23 is a perspective view of an entertainment seat assembly having a seat back in a reclined position, an integral foot rest in an extended position, and both arm rests in a deployed, use position, according to an exemplary embodiment.

Referring now to FIGS. 22 and 23, an entertainment seat assembly 13 according to one exemplary embodiment is shown. The seat assembly 13 includes a seat portion (seat base) 300 supported by a frame-like undercarriage. The frame includes legs 302. An integral footrest (leg rest) assembly 304 is connected by a linkage mechanism (not shown) through the frame so as to move between retracted (FIG. 22) and extended (FIG. 23) conditions upon demand.

A back rest (seat back) 306 is supported by the frame at the rearward edge of the seat portion 300 and can be manipulated between generally erect (FIG. 22) and reclined (FIG. 23) positions to suit the comfort of an occupant. The back rest 306 has an intentionally designed contour to comfortably support the back portion of an occupant seated therein.

A head restraint 308 may be connected to the back rest 306 at its uppermost end. The head restraint 308 may either be rigidly fixed in position or adjustable to meet occupant preferences. Alternatively, the head restraint 308 (and indeed the footrest 304) may be eliminated all together in lower cost or special use versions of the seat assembly 13.

The seat assembly 13 includes at least one, but preferably two integral arm rests 310. Each arm rest 310 is pivotally connected to the backrest 306 using appropriate hardware (not shown). In an alternative construction (not shown), the arm rest 310 may be connected to the seat portion 300, or alternatively to the frame structure and/or rear legs 302. The arm rests 310 are individually moveable between a retracted position as shown on the right-handed side of FIG. 22, and an extended position as shown on the left-handed side of FIG. 22 and FIG. 23. A directional arrow in FIG. 22 illustrates the pivotal motion through which an armrest 310 is manipulated to return an extended arm rest 310 to its retracted, stowed or non-use position.

Each arm rest 310 includes an upper surface 312 which is appropriately shaped and padded so that, in the extended position, the forearm of an occupant can be comfortably rested thereon. In other words, an occupant's arm will lie in substantial surface-to-surface contact with the upper surface 312 of the arm rests 310 when the arm rests 310 are in the extended or deployed condition. The arm rests 310 also include a lower surface 314 which is specially contoured and configured so that, when the armrest 310 is stowed in a non-use position, a generally fair, continuous curvature is formed with the backrest 306. This is depicted in FIG. 22, showing that the lower surface 314 of the arm rest 310, when stowed, completes a fully contoured seat backrest 306, thereby providing added comfort and support to an occupant.

The backrest 306 is preferably designed with scalloped side edges 316 having a profile that conforms to an inner-surface curvature 318 of each arm rest 310. In other words, the inner-surface curvature 318 of the arm rest 310 fits much like a puzzle piece against the scalloped edges 316 of the backrest 306 when the arm rest 310 is in its stowed, non-use position.

Thus, according to this embodiment, the seat assembly 13 creates an arm rest 310 that is preferably, integral with the seat back 306. When the arm rest 310 is in an up, out of the way position, a wider seat back 306 is created. When the arm rest 310 is in a down position, it is convenient for the occupant to utilize the upper support surface 312 for resting arms and elbows. The retractable arm rests 310 are also conducive to placing two or more seat backs 306 side-by-side and, owing to the contoured lower surfaces 314, thereby providing an uninterrupted surface for multiple occupants.

In another alternative embodiment, two adjacent seats 13 may share a common arm rest 310, with its lower surface 314 providing a transitioning contour between the respective back rests 306. The seat assembly 13 may be utilized in applications other than home theater seating, including land vehicles, aircraft, nautical vehicles, and the like.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of embodiments of the innovation has been presented for purposes of illustration and description. It is not intended to be exhaustive or to limit the innovation to the precise form disclosed, and modifications and variations are possible in light of the above teachings or may be acquired from practice of the innovation. The embodiments were shown and described in order to explain the principals of the innovation and its practical application to enable one skilled in the art to utilize the innovation in various embodiments and with various modifications as are suited to the particular use contemplated.

It is also important to note that the construction and arrangement of the elements of the entertainment and gaming seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A seat comprising:
   a seat base frame having a first side and a second side spaced laterally from the first side, the seat base frame having a front portion and a rear portion;
   a seat back frame coupled to pivot with respect to the seat base frame;
   a motion system for providing seat movement, wherein the motion system comprises:
   a first actuator having a first engaging member, the first actuator coupled to the first side of the seat base frame to move a first portion of the seat along a first vertically oriented axis;
   a second actuator having a second engaging member, the second actuator coupled to the second side of the seat base frame to move a second portion of the seat along a second vertically oriented axis;
   a third engaging member fixed directly to the seat base located centrally between the first and second sides of the seat base frame and positioned toward the rear area of the seat;
   a motion control unit coupled to the seat for controlling movement of the first and second actuators of the seat with respect to the third engaging member; and
   a leg rest pivotally coupled to the front portion of the seat base frame for leg support when the seat is reclined; and
   a link member located laterally within the seat base frame, the link member having a first and second end; wherein the first end is coupled to the seat back frame and the second end is coupled to the leg rest; and wherein reclining the seat back moves the link member forward, thereby rotating the leg rest upward into a reclined position.

2. The seat of claim 1 wherein the seat pivots about the third engaging member when the first and second actuators are activated by the motion control unit.

3. The seat of claim 1 further comprising a lost motion device to enable the seat back frame to pivot a predetermined amount without the leg rest rotating upward by the link member.

4. The seat of claim 1 further comprising a first interface fixedly coupled to the seat.

5. The seat of claim 4 further comprising first and second arm rests, and wherein the first interface is fixedly coupled to the first or second arm rest of the seat.

6. The seat of claim 5 wherein the controller is located on the first or second arm rest.

7. The seat of claim 4 wherein the first interface is a video display.

8. The seat of claim 1 wherein the seat further comprises first and second cushion members.

9. The seat of claim 8 wherein the second cushion member is a foam member that is overlaid onto the first cushion member.

10. The seat of claim 1 further comprising a controller for adjusting the motion control system.

11. A seat comprising:
    a seat base frame having a first side and a second side spaced laterally from the first side, the seat base frame having a front portion and a rear portion;
    a seat back frame coupled to pivot with respect to the seat base frame;
    a motion system for providing seat movement, wherein the motion system comprises:
    a first actuator having a first engaging member, the first actuator coupled to the first side of the seat base frame to move a first portion of the seat along a first vertically oriented axis;
    a second actuator having a second engaging member, the second actuator coupled to the second side of the seat base frame to move a second portion of the seat along a second vertically oriented axis;
    a third engaging member fixed directly to the seat base located centrally between the first and second sides of the seat base frame and positioned toward the rear area of the seat;
    a motion control unit coupled to the seat for controlling movement of the first and second actuators of the seat with respect to the third engaging member; and
    wherein the motion control unit is coupled to a pair of cross members located centrally between the front portion and the rear portion of the seat base frame and that extend from the first side of the seat base frame to the second side of the seat base frame, and is positioned within the center of the seat base frame.

* * * * *